United States Patent
Morris (10) Patent No.: US 10,384,154 B2
(45) Date of Patent: Aug. 20, 2019

(54) HIGH PRESSURE SAND TRAP WITH SCREEN

(71) Applicant: Jay R. Morris, Langdon (CA)

(72) Inventor: Jay R. Morris, Langdon (CA)

(73) Assignee: Gasteq Inc., Grande Prairie (CA)

( * ) Notice: Subject to any disclaimer, the term of this patent is extended or adjusted under 35 U.S.C. 154(b) by 665 days.

(21) Appl. No.: 15/140,901

(22) Filed: Apr. 28, 2016

(65) Prior Publication Data
US 2017/0182435 A1   Jun. 29, 2017

(30) Foreign Application Priority Data

Dec. 23, 2015  (CA) .................................... 2916272

(51) Int. Cl.
*B01D 29/11*   (2006.01)
*B01D 29/35*   (2006.01)
*B01D 29/56*   (2006.01)
*B01D 29/58*   (2006.01)
(Continued)

(52) U.S. Cl.
CPC .......... *B01D 29/117* (2013.01); *B01D 29/356* (2013.01); *B01D 29/56* (2013.01); *B01D 29/58* (2013.01); *B01D 29/66* (2013.01); *B01D 35/02* (2013.01); *B01D 2201/46* (2013.01)

(58) Field of Classification Search
None
See application file for complete search history.

(56) References Cited

U.S. PATENT DOCUMENTS

| 908,308 | A | * | 12/1908 | Mueller | ................. | B01D 29/23 |
| | | | | | | 210/306 |
| 1,150,086 | A | * | 8/1915 | Willemstyn | ........... | B01D 35/12 |
| | | | | | | 210/299 |

(Continued)

FOREIGN PATENT DOCUMENTS

| CA | 2916272 A1 * | 6/2017 | ........... B01D 29/356 |
| CN | 2207444 Y | 9/1995 | |

(Continued)

OTHER PUBLICATIONS

Euroslot Kdss (renamed Andritz Euroslot), Industrial Water Products, retrieved Oct. 15, 2015, online: <http://www.euroslotkdss.com/filtration/industrial-water/>. [*requires review}.

*Primary Examiner* — Robert J Popovics
(74) *Attorney, Agent, or Firm* — Davis & Bujold PLLC; Michael J. Bujold (57) ABSTRACT

There is provided a method of desanding a production flow with at least liquid and solid phases. An inlet is connected to a flow line of a sand trap body having a first filter housing defining a first bore and a plurality of second filter housings defining second bores each connected to the first filter housing at spaced intervals transverse to and in fluid communication with the first bore. The flow path between the stand trap inlet and outlet is defined by the first and second housings. A primary filter is inserted into each of the second bores, the production flow is flowed through the sand trap body such that the production flow is filtered by the primary filters, and then a secondary filter is inserted into the first bore. The mesh size of the primary filters is finer than or equal to the mesh size of the secondary filter.

13 Claims, 5 Drawing Sheets

(51) Int. Cl.
*B01D 29/66* (2006.01)
*B01D 35/02* (2006.01)

(56) References Cited

U.S. PATENT DOCUMENTS

| | | | | |
|---|---|---|---|---|
| 1,152,831 A * | 9/1915 | Monteagle | F16L 55/24 | 210/443 |
| 1,431,006 A * | 10/1922 | Kelsey | F04B 47/005 | 166/105.3 |
| 1,439,280 A * | 12/1922 | Westmoreland | F04B 47/005 | 166/105.3 |
| 1,455,871 A * | 5/1923 | Fleming | F04B 47/005 | 166/105.1 |
| 1,508,480 A * | 9/1924 | Skinner | B01D 35/02 | 210/308 |
| 1,519,042 A * | 12/1924 | Osborne | F04B 47/005 | 166/105.4 |
| 1,534,129 A * | 4/1925 | Marden | B01D 35/02 | 210/300 |
| 1,548,803 A * | 8/1925 | Cotton | F04B 47/005 | 166/105.1 |
| 1,590,128 A * | 6/1926 | Staples | B01D 29/35 | 210/409 |
| 1,623,015 A * | 3/1927 | Lawrence | F04B 47/005 | 166/105.3 |
| 1,652,173 A * | 12/1927 | Lalor | B01D 35/12 | 210/183 |
| 2,010,947 A | 8/1935 | Dunlap | | |
| 2,041,366 A * | 5/1936 | Moran | B01D 35/16 | 210/411 |
| 2,125,532 A * | 8/1938 | Wells | B01D 29/118 | 210/414 |
| 2,423,793 A * | 7/1947 | Olivo | E21B 43/34 | 210/535 |
| 2,507,591 A * | 5/1950 | Cox | B01D 35/02 | 425/198 |
| 2,681,736 A * | 6/1954 | Voorheis | B01D 35/12 | 137/625.29 |
| 3,349,547 A * | 10/1967 | Hoipkemeier | B01D 47/00 | 210/342 |
| 3,362,542 A * | 1/1968 | Stevens | E03B 3/16 | 210/521 |
| 3,618,781 A * | 11/1971 | Brown | B01D 35/12 | 137/545 |
| 3,622,006 A * | 11/1971 | Brunner | B01D 35/02 | 210/355 |
| 3,646,730 A * | 3/1972 | Reid | B01D 46/0021 | 55/302 |
| 3,679,060 A * | 7/1972 | Smith | B01D 35/12 | 210/333.1 |
| 3,793,812 A * | 2/1974 | Willis | B01D 45/12 | 55/319 |
| 3,888,644 A * | 6/1975 | Holland | B01D 46/00 | 55/318 |
| 3,959,140 A | 5/1976 | Legras | | |
| 4,106,562 A * | 8/1978 | Barnes | B01D 35/02 | 166/205 |
| 4,180,391 A * | 12/1979 | Perry, Jr. | B01D 45/16 | 55/324 |
| 4,297,116 A * | 10/1981 | Cusick | B01D 46/002 | 55/319 |
| 4,316,802 A * | 2/1982 | Howell | B01D 29/15 | 210/232 |
| 4,495,072 A * | 1/1985 | Fields | B01D 29/17 | 210/238 |
| 4,504,391 A * | 3/1985 | Weems, Sr. | B01D 29/15 | 210/307 |
| 4,579,653 A | 4/1986 | Davis | | |
| 4,609,459 A * | 9/1986 | Hendrix | B01D 29/15 | 210/91 |
| 4,673,500 A * | 6/1987 | Hoofnagle | B01D 11/0219 | 210/307 |
| 4,745,943 A * | 5/1988 | Mortensen | B01D 45/04 | 137/177 |
| 5,113,941 A * | 5/1992 | Donovan | E21B 43/12 | 166/113 |
| 5,132,013 A * | 7/1992 | Thompson | B01D 29/35 | 210/448 |
| 5,223,136 A * | 6/1993 | Gilbert | B01D 29/33 | 210/315 |
| 5,401,397 A * | 3/1995 | Moorehead | B01D 29/114 | 210/108 |
| 5,443,722 A * | 8/1995 | Desai | B01D 29/35 | 137/625.21 |
| 5,595,656 A * | 1/1997 | Yun | B01D 29/6438 | 210/416.1 |
| 5,772,879 A * | 6/1998 | Jaikaran | B01D 46/10 | 210/107 |
| 5,775,442 A * | 7/1998 | Speed | E21B 21/067 | 175/206 |
| 5,795,473 A * | 8/1998 | Marks | B01D 29/114 | 210/232 |
| 5,863,443 A * | 1/1999 | Mainwaring | B01D 21/0012 | 210/800 |
| 5,919,284 A * | 7/1999 | Perry, Jr. | B01D 45/02 | 55/319 |
| 6,056,797 A * | 5/2000 | Richard | B01D 41/04 | 55/302 |
| 6,719,900 B2 * | 4/2004 | Hawkins | B01D 29/118 | 210/248 |
| 6,766,856 B1 * | 7/2004 | McGee | E21B 21/065 | 137/546 |
| 6,841,007 B1 * | 1/2005 | Howard | B01D 29/114 | 134/8 |
| 6,983,852 B2 * | 1/2006 | Hemstock | E21B 43/34 | 210/519 |
| 7,014,685 B2 * | 3/2006 | Burns | B01D 29/114 | 55/356 |
| 7,048,865 B1 * | 5/2006 | McGee | E21B 43/34 | 166/75.12 |
| 7,155,967 B2 | 1/2007 | Rylander et al. | | |
| 7,223,298 B2 * | 5/2007 | Platt | B01D 46/0004 | 210/340 |
| 7,383,958 B2 * | 6/2008 | Hemstock | E21B 43/34 | 166/75.12 |
| 7,473,359 B1 * | 1/2009 | Barrett, II | B01D 29/35 | 134/168 C |
| 7,540,902 B2 * | 6/2009 | Esparza | B01D 19/0042 | 210/537 |
| 7,731,037 B2 * | 6/2010 | Frazier | B01D 21/0006 | 210/532.1 |
| RE41,556 E * | 8/2010 | McGee | E21B 43/34 | 166/75.12 |
| 7,896,959 B1 * | 3/2011 | Schopf, Jr. | B01D 46/0012 | 210/340 |
| 8,002,983 B2 * | 8/2011 | Wanni | B01D 29/01 | 210/304 |
| RE42,772 E * | 10/2011 | McGee | B01D 21/2483 | 137/546 |
| 8,454,843 B2 * | 6/2013 | Brown | B01D 21/245 | 166/267 |
| 8,623,221 B1 | 1/2014 | Boyd et al. | | |
| 8,794,263 B2 * | 8/2014 | Scott | B01D 46/0058 | 137/599.14 |
| 8,881,803 B1 * | 11/2014 | Frost | E21B 27/005 | 166/105.1 |
| 8,936,661 B2 * | 1/2015 | Burns | B01D 46/0024 | 55/482 |
| 8,945,256 B2 * | 2/2015 | Hemstock | B01D 21/0003 | 210/519 |
| 8,945,395 B2 * | 2/2015 | Tweit | E21B 21/066 | 166/267 |
| 8,951,333 B2 * | 2/2015 | Cabourdin | B01D 45/12 | 55/318 |
| 8,961,792 B2 * | 2/2015 | Desai | B01D 35/12 | 210/234 |
| 8,986,431 B2 * | 3/2015 | Cabourdin | B01D 46/2407 | 55/309 |

(56) References Cited

U.S. PATENT DOCUMENTS

| | | | |
|---|---|---|---|
| 9,095,799 B1* | 8/2015 | Packard | B01D 35/023 |
| 9,327,219 B2* | 5/2016 | Brunswick | B01D 29/6476 |
| 9,345,994 B2* | 5/2016 | Morris | E03B 7/074 |
| 9,421,484 B2* | 8/2016 | Ford | B01D 35/02 |
| 9,573,141 B2* | 2/2017 | Abraham | B01D 29/111 |
| 9,631,641 B2* | 4/2017 | Choi | F04B 23/04 |
| 9,649,584 B2* | 5/2017 | Burns | B01D 46/0024 |
| 9,816,338 B1* | 11/2017 | Hanson | E21B 43/084 |
| 9,909,405 B2* | 3/2018 | Hemstock | B01D 19/0021 |
| 9,937,442 B2* | 4/2018 | Hendrix | E21B 43/34 |
| 9,938,812 B2* | 4/2018 | Hemstock | B01D 21/0003 |
| 2003/0183587 A1* | 10/2003 | Hawkins | B01D 29/118 210/787 |
| 2004/0074838 A1* | 4/2004 | Hemstock | E21B 43/34 210/513 |
| 2004/0168958 A1* | 9/2004 | Eggleston | B01D 29/117 210/95 |
| 2005/0023196 A1* | 2/2005 | Ku | B01D 35/02 210/90 |
| 2005/0150842 A1* | 7/2005 | Puik | B01D 17/12 210/744 |
| 2006/0207426 A1* | 9/2006 | Platt | B01D 46/0004 95/286 |
| 2007/0175815 A1 | 8/2007 | Thomas | |
| 2007/0251878 A1 | 11/2007 | Saveliev et al. | |
| 2008/0251467 A1* | 10/2008 | Wanni | B01D 29/01 210/775 |
| 2010/0116732 A1* | 5/2010 | Jung | B01D 29/114 210/447 |
| 2010/0155336 A1* | 6/2010 | Simonson | B01D 35/02 210/695 |
| 2010/0294317 A1* | 11/2010 | Dufrene | B01D 21/10 134/22.18 |
| 2011/0266228 A1* | 11/2011 | Brown | B01D 21/245 210/801 |
| 2012/0000835 A1* | 1/2012 | Desai | B01D 35/12 210/137 |
| 2013/0105416 A1* | 5/2013 | Whitehead | B01D 29/35 210/806 |
| 2013/0134109 A1* | 5/2013 | Tweit | E21B 21/066 210/803 |
| 2013/0140247 A1* | 6/2013 | Ford | B01D 35/02 210/767 |
| 2014/0001117 A1* | 1/2014 | Abraham | B01D 29/111 210/512.2 |
| 2014/0027357 A1* | 1/2014 | Morris | E03B 7/074 210/85 |
| 2014/0332473 A1* | 11/2014 | Haberman | C02F 1/004 210/741 |
| 2015/0034185 A1* | 2/2015 | Winborn | B01D 35/02 137/544 |
| 2015/0090122 A1* | 4/2015 | Hemstock | B01D 21/0003 95/241 |
| 2016/0038953 A1* | 2/2016 | Abraham | B01D 29/111 210/512.2 |
| 2016/0074781 A1* | 3/2016 | Winborn | B01D 35/02 137/550 |
| 2016/0082377 A1* | 3/2016 | Hemstock | B01D 19/0021 95/258 |
| 2016/0377094 A1* | 12/2016 | Choi | F04B 23/04 210/798 |
| 2017/0182435 A1* | 6/2017 | Morris | B01D 29/356 |

FOREIGN PATENT DOCUMENTS

| | | | |
|---|---|---|---|
| CN | 201308800 Y | 9/2009 | |
| CN | 201371003 Y | 12/2009 | |
| WO | WO-2017059664 A1 * | 4/2017 | E21B 43/08 |

* cited by examiner

HIGH PRESSURE SAND TRAP WITH SCREEN

TECHNICAL FIELD

This relates to a high pressure sand trap having a screen that is removable from the sand trap.

BACKGROUND

Production fluids from oil and gas wells typically have a sand content, along with other contaminants and particulate matter. As the solids content of the production flow is abrasive and causes wear on equipment, as well as not being desired in the final product, sand trap devices are employed to filter sand from the production stream. U.S. Pat. No. 2,125,532 teaches a strainer for separation of contaminants from a continuous flow.

When formation conditions are appropriate, hydrocarbon producing wells are stimulated by fracturing the formation with sand, a technique known as "fracing". For this fracing procedure, very fine abrasive sand is used. Problems are being experienced with some of this fine abrasive sand appearing, without warning, in well production. The problem is not apparent until it manifests itself and sand starts appearing in the equipment. When it occurs, it can be difficult to determine whether the formation is merely "burping" small amounts of sand periodically or whether there is a more serious sand problem requiring a sand separator. The problem cannot be ignored. Even when present in small quantities, sand can damage equipment. When present in larger quantities, abrasive sand can wear through pipes and cause serious problems resulting in leakage into the environment and the threatening the lives of oil field workers.

SUMMARY

According to an aspect, there is provided a method of desanding a production flow in a flow line, the production flow comprising at least a liquid phase and a solid phase, the method comprising the steps of connecting the flow line to an inlet of a sand trap body, the sand trap body comprising a first filter housing defining a first bore that is in axial alignment with the flow line and a plurality of second filter housings connected to the first filter housing at spaced intervals along the first bore, each of the second filter housings defining a second bore that is transverse to and in fluid communication with the first bore, the first filter housing and the plurality of second filter housings defining a flow path between the inlet and an outlet, inserting a primary filter into each of the second bores, inserting a secondary filter into the first bore, wherein a mesh size of the primary filters is finer than or equal to a mesh size of the secondary filter, and after inserting the primary filter and prior to inserting the secondary filter, flowing the production flow through the sand trap body such that the production flow is filtered by the primary filters.

According to another aspect, the method may further comprise the step of, after inserting the secondary filter, flowing the production flow through the sand trap body such that the production flow is filtered by the secondary filter and the primary filters.

According to another aspect, the first bore may be horizontal and the second bores may be vertical.

According to another aspect, the second filter housings may connect to a common outlet header.

According to another aspect, the secondary filter may be inserted after a predetermined time has elapsed.

According to another aspect, the secondary filter may be inserted after a proportion of the solid phase in the production flow is less than a predetermined threshold.

According to another aspect, the method may further comprise the step of flushing the sand trap body using a blowdown connection.

According to another aspect, the first filter housing may comprise a retaining ring sealably anchored within the first bore and adjacent to the inlet, the retaining ring having a first part of a two part connector, the secondary filter may comprise a first end and a second end, the first end comprising a second part of the two part connector, and inserting the secondary filter may comprise attaching the second part to the first part such that the filter is sealably attached to the retaining ring and interposed between the inlet and the second bores.

According to an aspect, there is provided a sand trap body for filtering a production flow, the sand trap body comprising a filter housing defining a bore, the filter housing having an inlet, an outlet and a flow path between the inlet and the outlet through the bore, a retaining ring sealably anchored to the filter housing within the bore and adjacent to the inlet, the retaining ring having a first part of a two part connector, a filter having a first end and a second end, the first end comprising a second part of the two part connector, the second part connecting to the first part such that the filter is sealably attached to the retaining ring and interposed between the inlet and the outlet, and a wedge plate carried by the retaining ring, the wedge plate being positioned in the flow path upstream of the filter.

According to another aspect, the filter housing may comprise a removable end in axial alignment with the retaining ring.

According to another aspect, the two part connector may comprise a threaded coupling.

According to another aspect, the sand trap may further comprise a plurality of second filter housings connected to the filter housing at spaced intervals along the bore, each of the second filter housings defining a secondary bore that is transverse to and in fluid communication with the bore and a transverse filter within each secondary bore.

According to another aspect, the bore may be horizontal and the secondary bores may be vertical.

According to another aspect, a mesh size of the transverse filters may be finer than or equal to a mesh size of the filter.

According to another aspect, the second filter housings may connect to a common outlet header.

According to another aspect, the filter housing may comprise a blowdown connector that flows a blowdown fluid into the filter.

According to another aspect, the retaining ring may carry a wedge plate that conditions the fluid entering the filter housing.

According to another aspect, the wedge plate may comprise bars that extend transversely across the inlet upstream of the filter.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A high pressure sand trap generally identified by reference numeral 10, will now be described with reference to FIG. 1 through 8.

Figure 1:
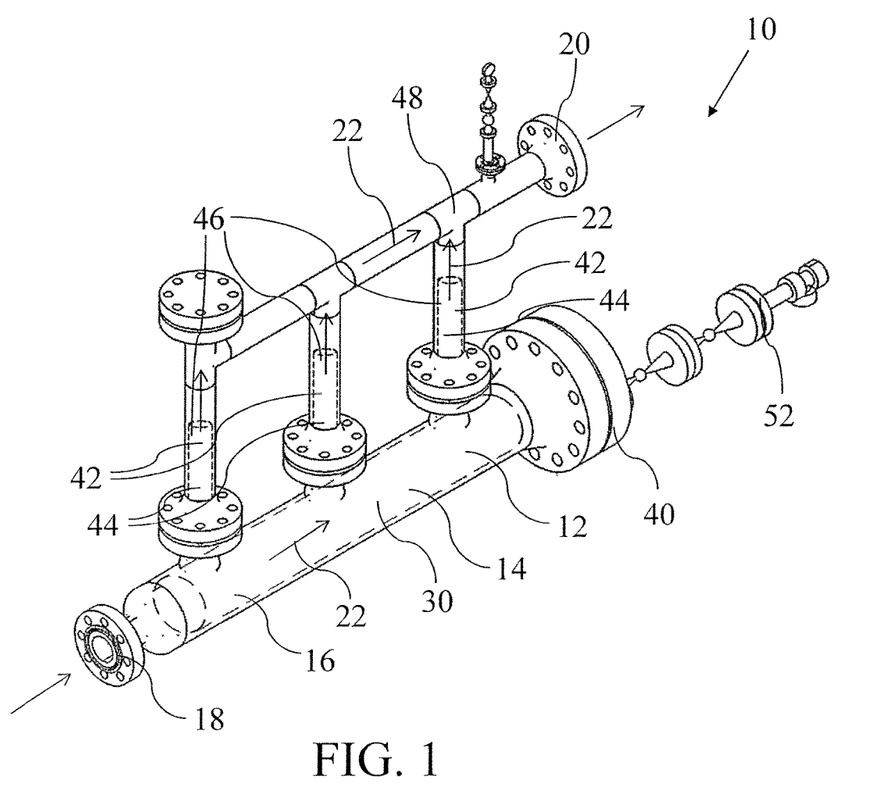
FIG. 1 is a partially transparent perspective view of a high pressure sand trap.
Figure 2:
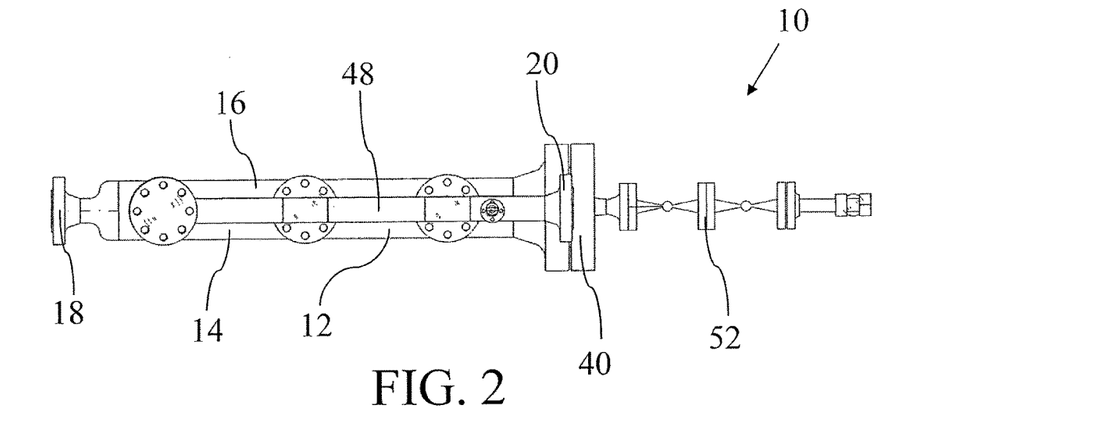
FIG. 2 is a top plan view of the high pressure sand trap shown in FIG. 1.
Figure 3:
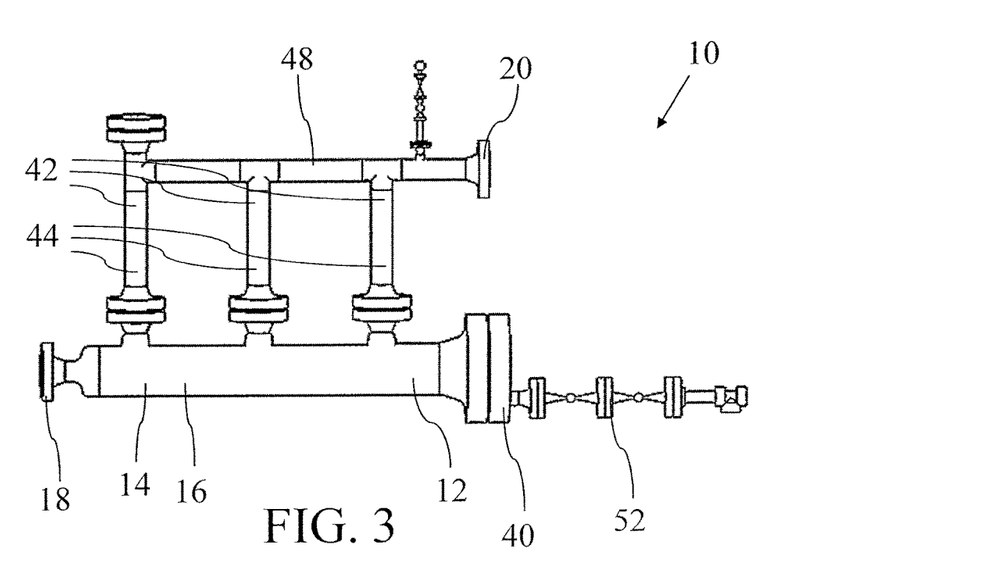
FIG. 3 is a side elevation view of the high pressure sand trap shown in FIG. 1.

Referring to FIG. 1, high pressure sand trap 10 has a sand trap body 12 for filtering a production flow. Sand trap body 12 has a filter housing 14 defining a bore 16, and has an inlet 18, an outlet 20 and a flow path 22 between the inlet and the outlet through bore 16.

Figure 4:
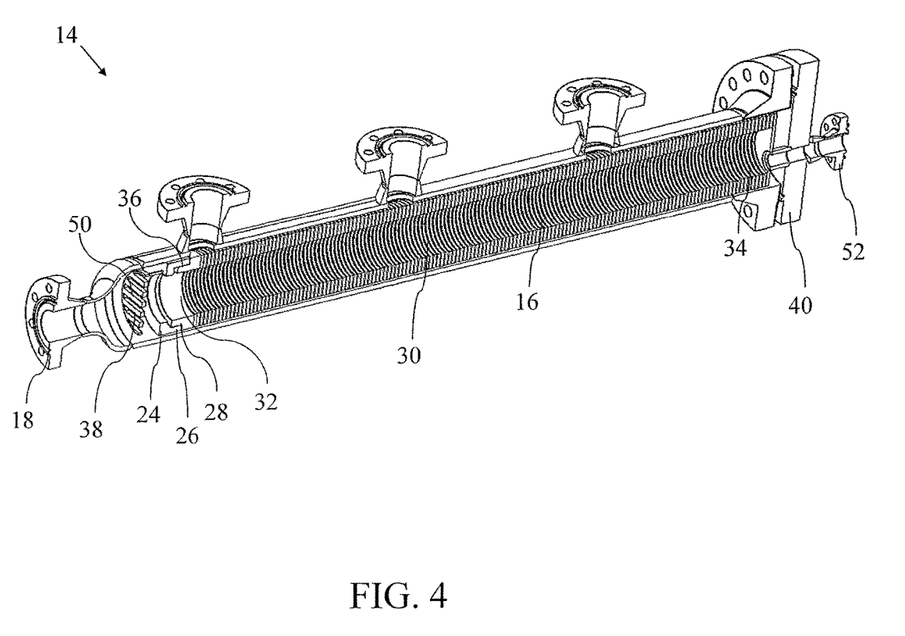
FIG. 4 is a perspective view in cross section of a first filter housing of a high pressure sand trap with a filter inserted.
Figure 7:
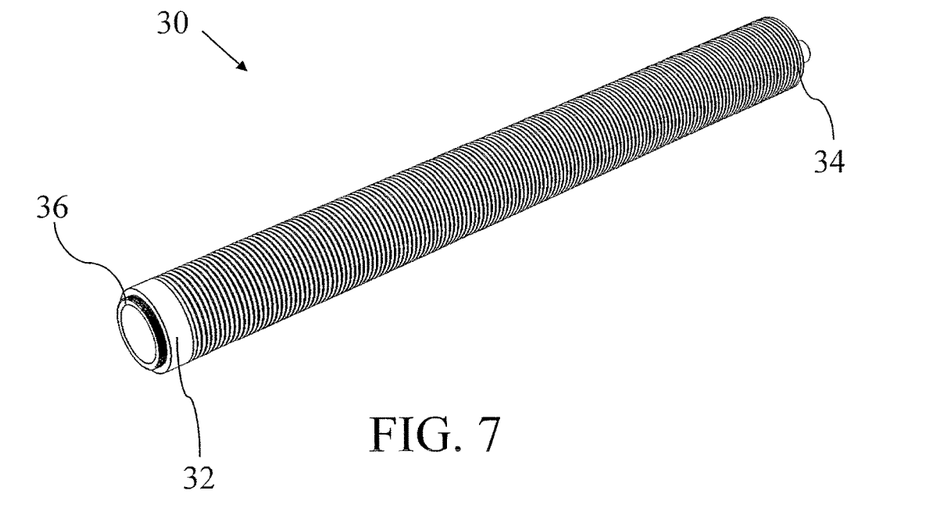
FIG. 7 is a perspective view of a first side of a filter.
Figure 8:
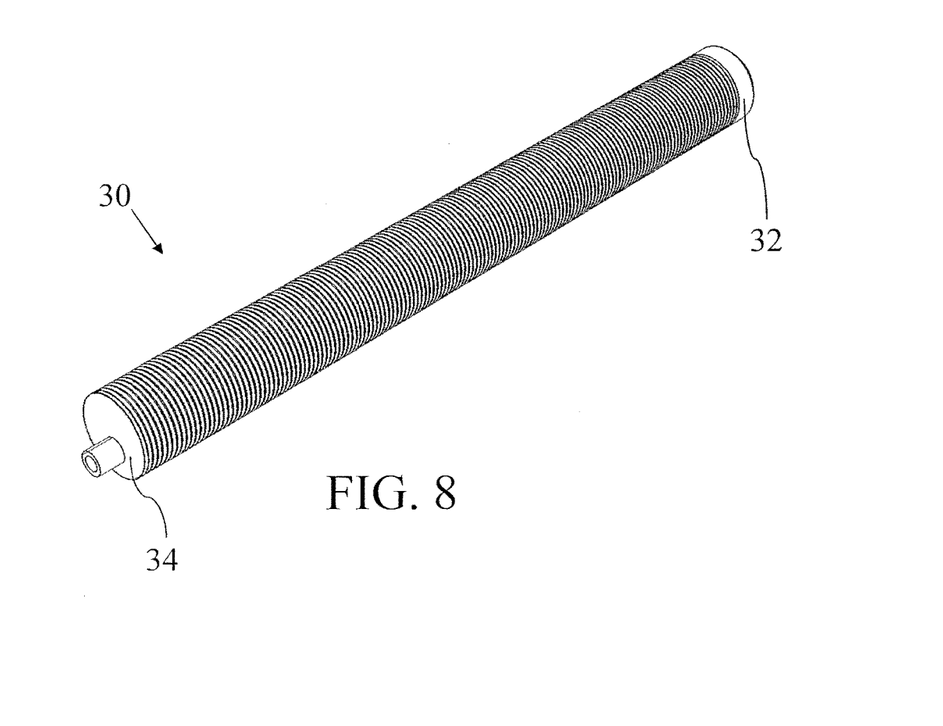
FIG. 8 is a perspective view of a second side of the filter shown in FIG. 7.

Referring to FIG. 4, a retaining ring 24 is sealably anchored, such as by welding, to filter housing 14 within bore 16 and adjacent to inlet 18. Retaining ring 24 is used as an anchor for a filter 30, and has a first part 26 of a two part connector 28. Filter 30 has a first end 32 and a second end 34, where first end 32 has the second part 36 of the two part connector 28. Filter 30 may be a mesh filter as shown in FIG. 7 and FIG. 8. It will be understood that filter 30 may take a variety of forms, and is preferably a cylindrical filter as shown. Second part 36 connects to first part 26 of two part connector 28 such that filter 30 is sealably attached to retaining ring 24 and interposed between inlet 18 and outlet 20. Two part connector 28 may be formed from a variety of sealing connections, as will be understood by those skilled in the art, but is preferably a threaded coupling as shown. Filter 30 is installed by removing removable end 40, which is in axial alignment with retaining ring 24, and inserting filter 30 into inner bore 16. Filter 30 engages retaining ring 24 to make up the two part connector 28, at which point first end 32 of filter is sealably engaged within filter housing 14 via retaining ring 24. By providing retaining ring 24, which is anchored within filter housing 14, and sealably attaching filter 30 to retaining ring 24, fluid pressure is directed to the inside of filter 30, and is forced to cross through filter 30. This may be important in high pressure situations, as doing so will prevent fluid pressure from bypassing filter 30 and ensure the pressure differential is maintained across filter 30 from the inside out.

Figure 5:
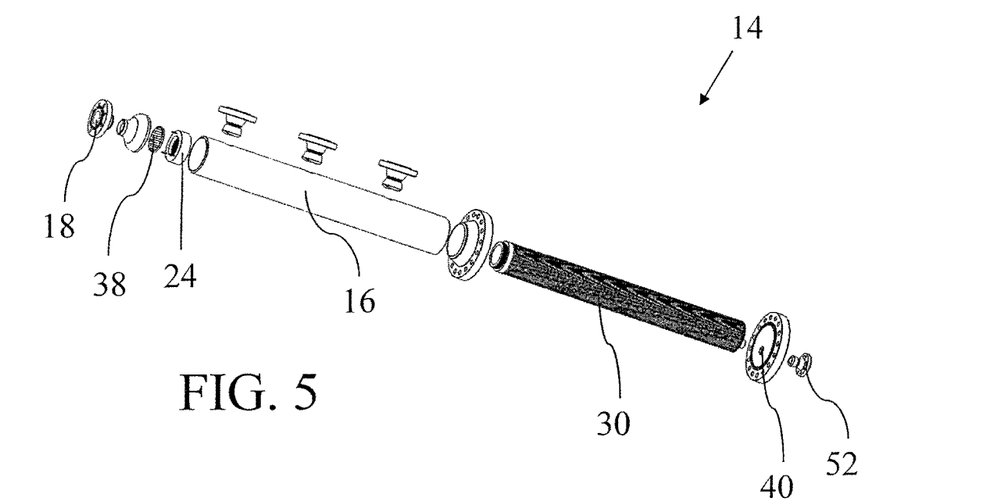
FIG. 5 is an exploded perspective view of the first filter housing shown in FIG. 4.
Figure 6:
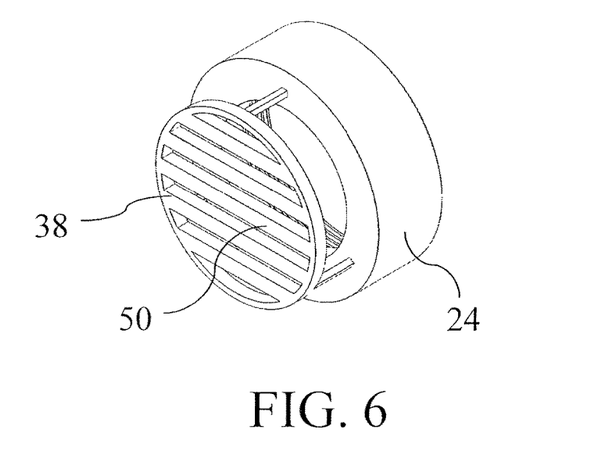
FIG. 6 is a perspective view of a sand wedge plate.

Retaining ring 24 carries a wedge plate 38 that is positioned in flow path 22 upstream of filter 30. Wedge plate 38 may take a variety of forms, and in the depicted example, has bars 50 that extend transversely across inlet 18 upstream of filter 30. Wedge plate 38 may condition the fluid entering filter housing 14. Referring to FIG. 5, filter housing 14 may have a removable end 40 that is in axial alignment with retaining ring 24. Filter housing 14 may also have a blow-down connector 52 to facilitate injecting a fluid to remove or reduce the amount of accumulated sand in the filter system through the various valves in connection with sand trap body 12.

Referring to FIG. 1, high pressure sand trap 10 may also be formed with a plurality of second filter housings 42 connected to filter housing 14 at spaced intervals along bore 16. Each of the second filter housings 42 defines a secondary bore 44 that is transverse to and in fluid communication with bore 16. As shown, preferably filter housing 14 is oriented horizontally, while second filter housing 42 are oriented vertically. Preferably, second filter housings 42 all connect to a common outlet header 48 as shown, which acts as outlet 20. Additional filters 46 are placed within each secondary bore, and may be installed and attached to secondary filter housings 42 using a variety of approaches, as will be understood by those skilled in the art. Vertical filters 46 may be any suitable type of filter, such as mesh filters, similar to those shown in FIG. 7 and FIG. 8, or other forms. Filters 30 and 46 may be provided with different filtration capabilities. For example, where filters 30 and 46 are mesh filters, vertical filters 46 may be provided with a mesh size that is finer than or equal to a mesh size of filter 30. Where filters 30 and 46 are perforated metal screens, vertical filters 46 may have a perforation size that is smaller than or equal to the perforation size of filter 30. When filter 30 and vertical filters 46 are provided with differing filtration capabilities, filter 30 may be used to filter out larger particles from the fluid flow and the wear on vertical filters 46. As depicted, sand trap 10 is oriented such that bore 16 is horizontal and secondary bores 44 are vertical. It will be understood that providing this orientation allows for sand collection in filter housing 14 to be assisted by gravity, and also allows sand to fall out of vertical filters 46. It will be understood that other orientations may be used depending on the space available and other operating concerns.

Operation

High pressure sand trap 10 is used to desand a production flow in a flow line. The production flow will typically be a mixture of a variety of phases, and will have at least a liquid phase and a solid phase, and may have a gas phase, depending on the characteristics of the well, and the other separation equipment that may be present at the well site.

The production flow line (not shown) is connected to inlet 18 of sand trap body 12. In some circumstances, such as when starting production from a well, or after a well treatment, there may be a high concentration of solids, or sand, in the production fluids. In that situation, it may be useful to configure sand trap 10 to more efficiently handle the amount of sand. In such a case, primary filters 46 are inserted into each of the second bores 44, as shown in FIG. 1, while allowing the production flow to pass through bore 16 unfiltered. After inserting primary filters 46, the production flow is flowed through sand trap body 12, and primary filters 46 are used to filter sand from the production flow. Wedge plate 38, attached to retaining ring 24, will serve to condition the flow, and in particular, to reduce the velocity of the flow entering the sand trap body 12 to protect the components downstream of wedge plate 38, depending on the design of wedge plate 38. As filters are only located in the vertical sections of sand trap body 12, accumulations of sand will tend to fall into the horizontal section in bore 16. Which does not have a filter screen. If a screen were present in bore 16, the accumulation of sand could affect the level of flow through sand trap body 12. This configuration will continue to remove solids that are larger than a particular threshold, but will also result in a higher wear on filters 46. However the configuration is intended to be only temporary, and is particularly useful in situations where, if a filter 30 were provided in bore 16, it would be necessary to stop the flow through sand trap body 12 in order to service or clean out bore 16. By not using filter 30 in bore 16, some circumstances may allow sand trap body 12 to operate for a longer period of time before requiring servicing, or allow sand trap body 12 to operate more efficiently before servicing is required.

While this arrangement will typically be used at the start-up of the production flow when the solids content of the production fluid is high, it may be used at other times, and depending on the requirements of the user, different indicators may be used to determine when the filtration mode will be changed. For example, the filtration configuration may be changed when sand trap 10 requires servicing for another reason, after a predetermined time has elapsed, or after a proportion of the solid phase in the production flow is less than a predetermined threshold. Once it has been determined that the mode is to be changed, the flow through sand trap body 12 is stopped, and secondary filter 30 is inserted into first bore 16. Flow may then be resumed through sand trap body 12. Secondary filter 30 may be inserted through removable end 40, and inserted through first bore 16 in order to attach second part 36 of two part connector 28 to first part 26, connecting secondary filter 30 to retaining ring 24. As discussed above, the filter size of primary filters 46 will typically be finer than or equal to a filter size of secondary filter 30, such that the production flow will be filtered by both secondary filter 30 and primary filters 46. At any point required during the process, as will be understood by those skilled in the art, sand trap body 12 may be flushed using blowdown connection 52.

The installation of filter 30 after the initial start-up phase reduces the probability of clogging due to the potential of thick residuals such as hydrates or wax, and large proportions of sand and water settling within filter 30 and restricting gas flow through the screen openings. During start up, this may result in a high differential pressure across filter 30, and require multiple well shutdowns in order to clear out filter 30 and sand trap 10. Gravity allows for settling of filtered materials from vertical filters 46, reducing the requirement for shut down of the well, and allowing the filtered out material to collect in filter housing 14. Once the start-up phase is completed, or a particular threshold or timeframe is passed, filter 30 is installed, which introduces a two stage filtration system, allowing for different filter screen sizes to be used if required. Filter 30 reduces the load on vertical filters 46, as well as reducing the wear on filter housing 14 and other components of sand trap 10, extending the life of the device during normal operation.

The following describes one example embodiment and method of use of the high pressure sand trap 10. It will be understood that the specific values provided are given as an example only.

During start-up of the high pressure sand trap 10, vertical filters 46 are installed with a 250 Micron screen and a 2.75" diameter. Retaining ring 24 is welded to the interior of filter housing 14. Flow pressures through sand trap 10 are recorded, and the differential pressure through the vertical filters 46 is measured. When the pressure differential is greater than 350 Psi, sand trap 10 is opened, vertical filters 46 are inspected, and sand trap 10 is cleaned out. When the pressure differential is below 350 Psi, monitoring continues for three months from start-up of the device. Once this time has elapsed, sand trap 10 is opened, cleaned out, and filter 30 is installed. The screen size of filter 30 will be larger than the screen size of transverse filter 46. Optionally, the vertical filters 46 may also be replaced with filters 46 having a different screen size than that used during start up. Once both filter 30 and filters 46 have been installed, sand trap 10 is operated according to normal operation procedures. The pressure differential at filter 30 is then monitored in addition to the pressure differential at vertical filters 46, and when the pressure differential exceeds 700 Psi at filter 30, or 350 Psi at vertical filters 46, sand trap 10 is opened, inspected, and cleaned out. Should the pressure remain below this level, sand trap 10 will continue to be operated until it is no longer needed.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of desanding a production flow in a flow line, the production flow comprising at least a liquid phase and a solid phase, the method comprising the steps of:
   connecting the flow line to an inlet of a sand trap body, the sand trap body comprising:
   a first filter housing defining a first bore that is in axial alignment with the flow line; and
   a plurality of second filter housings connected to the first filter housing at spaced intervals along the first bore, each of the second filter housings defining a second bore that is transverse to and in fluid communication with the first bore;
   the first filter housing and the plurality of second filter housings defining a flow path between the inlet and an outlet;
   inserting a primary filter into each of the second bores;
   inserting a secondary filter into the first bore, wherein a mesh size of the primary filters is finer than or equal to a mesh size of the secondary filter; and
   after inserting the primary filter and prior to inserting the secondary filter, flowing the production flow through the sand trap body such that the production flow is filtered by the primary filters.

2. The method of claim 1, further comprising the step of, after inserting the secondary filter, flowing the production flow through the sand trap body such that the production flow is filtered by the secondary filter and the primary filters.

3. The method of claim 1, wherein the first bore is horizontal and the second bores are vertical.

4. The method of claim 1, wherein the second filter housings connect to a common outlet header.

5. The method of claim 1, wherein the secondary filter is inserted after a predetermined time has elapsed.

6. The method of claim 1, wherein the secondary filter is inserted after a proportion of the solid phase in the production flow is less than a predetermined threshold.

7. The method of claim 1, further comprising the step of flushing the sand trap body using a blowdown connection.

8. The method of claim 1, wherein:
   the first filter housing comprises a retaining ring sealably anchored within the first bore and adjacent to the inlet, the retaining ring having a first part of a two part connector;

the secondary filter comprises a first end and a second end, the first end comprising a second part of the two part connector; and inserting the secondary filter comprises attaching the second part to the first part such that the filter is sealably attached to the retaining ring and interposed between the inlet and the second bores.

9. The method of claim 8, wherein the retaining ring carries a wedge plate, the wedge plate being positioned in the flow path upstream of the filter.

10. The method of claim 9, wherein the wedge plate conditions the fluid entering the filter housing.

11. The method of claim 9, wherein the wedge plate comprises bars that extend transversely across the inlet upstream of the filter.

12. The method of claim 8, wherein the first filter housing comprises a removable end in axial alignment with the retaining ring.

13. The method of claim 8, wherein the two part connector comprises a threaded coupling.

\* \* \* \* \*